(12) United States Patent
Amat et al.

(10) Patent No.: US 10,906,267 B2
(45) Date of Patent: Feb. 2, 2021

(54) COMPOSITE STRUCTURE

(71) Applicant: Ratier-Figeac SAS, Figeac (FR)

(72) Inventors: Pascal Amat, Figeac (FR); Stéphane Grimal, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 409 days.

(21) Appl. No.: 15/804,179

(22) Filed: Nov. 6, 2017

(65) Prior Publication Data

US 2018/0126687 A1 May 10, 2018

(30) Foreign Application Priority Data

Nov. 4, 2016 (EP) .................................... 16306444

(51) Int. Cl.
| | |
|---|---|
| *B32B 1/02* | (2006.01) |
| *B32B 5/08* | (2006.01) |
| *B29C 70/16* | (2006.01) |
| *B29D 99/00* | (2010.01) |
| *B29C 70/86* | (2006.01) |
| *B29C 70/88* | (2006.01) |
| *B32B 1/08* | (2006.01) |

(Continued)

(52) U.S. Cl.
CPC ................ *B32B 5/08* (2013.01); *B29C 70/16* (2013.01); *B29C 70/865* (2013.01); *B29C 70/887* (2013.01); *B29D 99/0003* (2013.01); *B29D 99/0025* (2013.01); *B32B 1/02* (2013.01); *B32B 1/08* (2013.01); *B32B 3/12* (2013.01); *B32B 5/02* (2013.01); *B32B 5/18* (2013.01); *B32B 5/26* (2013.01); *B32B 37/14* (2013.01); *B64C 11/26* (2013.01); *B29K 2063/00* (2013.01); *B29K 2101/10* (2013.01); *B29K 2101/12* (2013.01); *B29K 2307/04* (2013.01); *B29K 2309/08* (2013.01); *B29L 2031/082* (2013.01); *B32B 2305/72* (2013.01); *B32B 2603/00* (2013.01); *F01D 5/282* (2013.01); *F04D 29/388* (2013.01); *F05D 2230/50* (2013.01)

(58) Field of Classification Search
CPC .... B32B 1/02; B32B 1/08; B32B 5/02; B32B 5/08; B32B 5/26
See application file for complete search history.

(56) References Cited

U.S. PATENT DOCUMENTS

| | | | |
|---|---|---|---|
| 5,346,367 A | 9/1994 | Doolin et al. | |
| 5,392,514 A | 2/1995 | Cook et al. | |

(Continued)

FOREIGN PATENT DOCUMENTS

| | | | |
|---|---|---|---|
| GB | 637827 A | 5/1950 | |
| GB | 2040790 A | 9/1980 | |
| WO | 9606776 A1 | 3/1996 | |

OTHER PUBLICATIONS

European Search Report for Application No. 16306444.7-1706 dated May 4, 2017, 8 Pages.

(Continued)

*Primary Examiner* — Walter Aughenbaugh
(74) *Attorney, Agent, or Firm* — Cantor Colburn LLP

(57) ABSTRACT

A method of manufacturing a composite component comprises forming a core, surrounding the circumference of the core with a first layer of fabric, applying a second layer of fabric having a different coefficient of thermal expansion from the first layer such that the second layer extends around at least a portion of the circumference of the core and curing the component such that the second layer imparts a compressive or tensile force on the core.

14 Claims, 2 Drawing Sheets

(51) Int. Cl.
 B32B 5/26 (2006.01)
 B32B 3/12 (2006.01)
 B32B 5/02 (2006.01)
 B32B 5/18 (2006.01)
 B32B 37/14 (2006.01)
 B64C 11/26 (2006.01)
 B29K 101/10 (2006.01)
 B29K 307/04 (2006.01)
 B29K 101/12 (2006.01)
 B29K 63/00 (2006.01)
 B29K 309/08 (2006.01)
 B29L 31/08 (2006.01)
 F01D 5/28 (2006.01)
 F04D 29/38 (2006.01)

(56) References Cited

U.S. PATENT DOCUMENTS

| | | |
|---|---|---|
| 5,439,353 A | 8/1995 | Cook et al. |
| 5,520,532 A | 5/1996 | Reinfelder et al. |
| 8,807,931 B2 | 8/2014 | Roberts |
| 2016/0208616 A1 | 7/2016 | Darrow |

OTHER PUBLICATIONS

European Official Letter for Application No. 16306444.7, dated Oct. 28, 2020, 6 pages.

COMPOSITE STRUCTURE

FOREIGN PRIORITY

This application claims priority to European Patent Application No. 16306444.7 filed Nov. 4, 2016, the entire contents of which is incorporated herein by reference.

TECHNICAL FIELD

The present disclosure relates to composite structures and methods for manufacturing composite structures.

BACKGROUND

Composite structures may comprise a closed structure including foam or honeycomb material core surrounded by a skin. Such structures are used, for example, in a spar of a propeller blade.

Residual thermal stresses can develop within the structure during cooling of the spar after the curing process due to the difference in thermal properties of the core material and the skin material. Such thermal stresses may cause cracks within the core material or delamination at the interface between the core material and the skin material. This results in a high volume of rejected parts and reduced service life of components.

SUMMARY

From a first aspect, this disclosure provides a method of manufacturing a composite component comprising forming a skin of the component by surrounding a central region of the component with a first layer of fabric, applying at least a second layer of fabric such that the second layer extends around at least a portion of the circumference of the central region wherein the at least a second layer of fabric includes at least one ply of material having a different coefficient of thermal expansion from the first layer and curing the component, whereby the differing coefficients of thermal expansion imparts a compressive or tensile force on the central region after curing.

This disclosure also provides a method of creating a compressive or tensile force on a composite component comprising forming a skin by surrounding a central region of the component with a first layer of fabric, applying at least a second layer of fabric such that the second layer extends around at least a portion of the circumference of the central region, wherein the at least a second layer of fabric includes at least one ply of material having a different coefficient of thermal expansion from the first layer; and curing the component, whereby the differing coefficients of thermal expansion imparts a compressive or tensile force on the central region after curing.

The method may further comprise applying a resin or thermoplastic matrix to the first and second layers after their application to the central region but prior to curing.

The first layer and/or second layer may be pre-impregnated with resin or thermoplastic matrix prior to attachment to the component.

This disclosure also provides a composite component comprising a central region and a shell surrounding the central region. The shell comprises at least one first layer of fabric and at least one second layer of fabric separate from the first layer. The at least one first layer extends around the entire circumference of the central region and the at least one second layer extends around at least a portion of the circumference of the central region, wherein the at least a second layer of fabric includes at least one ply of material having a different coefficient of thermal expansion from at the first layer such that the second layer imparts a compressive or tensile force on the central region.

The at least one ply may comprise fibres aligned at an angle relative to fibres in the first layer, for example wherein the angle is between ±45° and ±90°.

The at least one ply may comprise fibres of a different material from the fibres of the first layer, for example wherein the at least one ply comprises one of carbon fibres or glass fibres and the first layer comprises the other of carbon fibres or glass fibres.

The second layer may include at least two plies having different coefficients of thermal expansion to one another.

The second layer may extend around only a portion of the circumference of the central region.

The first layer may be positioned between the second layer and the central region.

The second layer may be positioned between the first layer and the central region.

The second layer may include a plurality of plies, wherein an outer ply of the plurality of plies extends over an inner ply of the plurality of plies such that it covers an edge of the inner ply.

The central region may comprise a core, for example wherein the core is formed from a foam, honeycomb material, hollow balls or wood such as balsa.

The fabric forming the first layer and/or second layer comprises carbon fibres and a matrix material, wherein the matrix material is a thermosetting resin such as an epoxy resin or a thermoplastic material.

The composite component maybe an airfoil structure having a leading edge and a trailing edge, the second layer extending around at least one of the leading edge and trailing edge. Additionally or alternatively, the airfoil may have a pressure side and a suction side, wherein the second layer extends along a portion of the pressure side and/or suction side.

The component may further comprise a third layer extending around a different portion of the circumference of the central region than the second layer such that it imparts a compressive force on the central region. The second layer may extend around the leading edge and the third layer may extend around the trailing edge of the airfoil structure.

The component may further comprise an outer layer surrounding the first and second layers such that the second layer is positioned between the first layer and the outer layer. The outer layer may extend around the entire circumference of the central region.

The airfoil structure may be a propeller blade or a spar for a propeller blade.

BRIEF DESCRIPTION OF DRAWINGS

Some embodiments of the disclosure will now be described by way of example only and with reference to the accompanying drawings in which.

DETAILED DESCRIPTION

Figure 1:
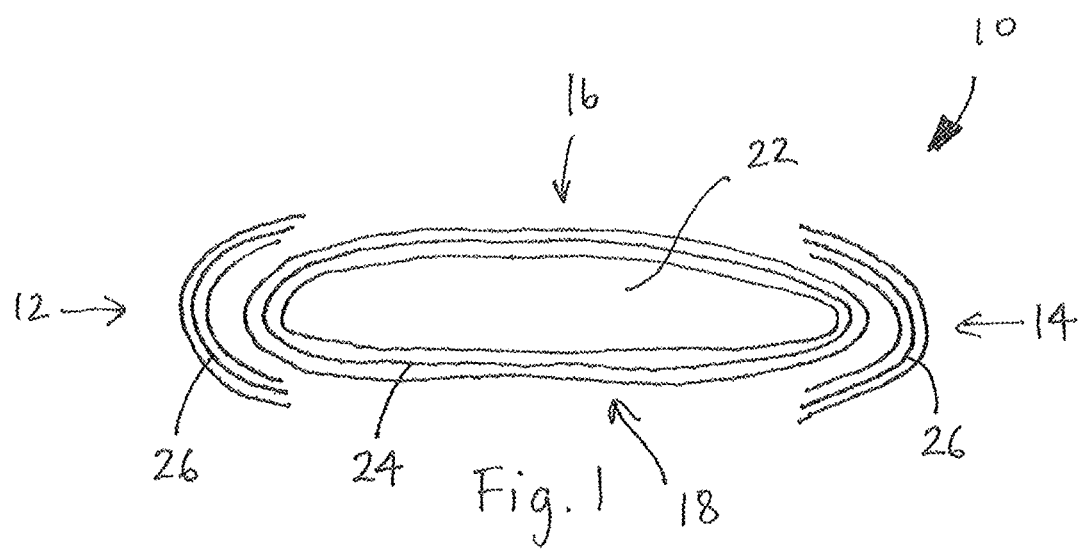
FIG. 1 shows a section view of a spar for a propeller blade according to an embodiment of the disclosure.

With reference to FIG. 1, an exemplary embodiment of composite component 10 is illustrated. The composite component 10 in this embodiment is a structural spar for a propeller blade although it will be appreciated that the present invention may be applied to other composite components, for example fan blades, helicopter blade including a core material, or any type of rigid structure bonded to a core material. The invention may also be applied to hollow structures having no core material.

The spar 10 includes a leading edge 12, a trailing edge 14, a suction side 16 and pressure side 18. The surfaces of the leading edge 12 and trailing edge 14 of the spar 10 have greater curvature than the pressure and suction sides 18, 16.

The spar 10 further includes a central core 22 and an outer skin 24 surrounding the central core 22 and forming an outer surface of the spar 10.

In this embodiment the central core 22 is made from a foam material. However, it will be appreciated that other core materials may be used depending on the application of the composite component, for example other composite components may include a core of honeycomb material, a core formed from hollow balls or a wooden core such as a balsa core.

In this embodiment the skin 24 is made from a fabric formed from carbon fibres pre-impregnated with a curable resin such as an epoxy resin. It will be appreciated that the skin may be formed from other structural fibres such as glass fibres or aramid fibres. In other embodiments, the skin 24 may be a dry fabric formed from any of the fibres described above, and a matrix material may be subsequently applied to the skin material 24 during manufacture as will be described in more detail below. The matrix material may be a thermosetting resin such as an epoxy resin or may be a thermoplastic material.

The spar 10 further includes a plurality of compression layers 26 positioned on the outer surface of the skin 24 at the leading edge 12 and trailing edge 14. In this embodiment the compression layers 26 are formed from the same material as used for the skin 24; however at least some of the fibres in the compression layers 26 are arranged at an angle with respect to the skin 24. More particularly, the compression layers 26 comprise at least a first ply in which the fibres at aligned at, for example, 0° to the blade axis and a second ply in which the fibres are aligned at 90o to the blade axis. It will be appreciated that fibres of each ply may be oriented at different angles relative to the blade axis and each other. For example, the fibres of the first ply may be oriented at any angle α relative to the blade axis where a is ±90°. The fibres of the second ply may be oriented at any angle β relative to the blade axis where a is ±90° and different from α.

Figure 3:
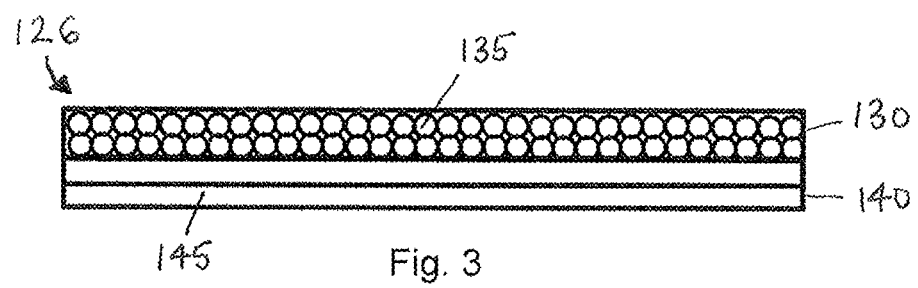
FIG. 3 shows a section view of a compression layer before curing.

A cross-sectional view of an example layup for a compression layer 126 is shown in FIG. 3. The layer 126 includes a first ply 130 and a second ply 140. The first ply 130 includes fibres 135 that are oriented orthogonal to the plane of section (i.e. coming out of the page). The second ply 140 includes fibres 145 that are oriented along the plane of section (i.e. across the page). In the embodiment, each ply includes two rows of carbon fibres, however other numbers of plies may be used. The differing orientation of the fibres in each ply 130, 140 results in different thermal expansion coefficients of the plies when attached to a blade. This difference causes bending of the layer 126 as it cools after curing as described further below.

In other arrangements the compression layers 26 may be formed from a different material to the skin 24 such as any of the pre-impregnated or dry fabrics described above. In one embodiment the first layer 130 may be formed from glass fibres and the second layer 140 may be formed from carbon fibres or vice versa. In these embodiments, the different materials lead to different coefficients of thermal expansion and therefore the fibres need not necessarily be angled relative to one another. The compression layers 26 may have a different thickness than the skin 24 or may have the same thickness.

Figure 2:
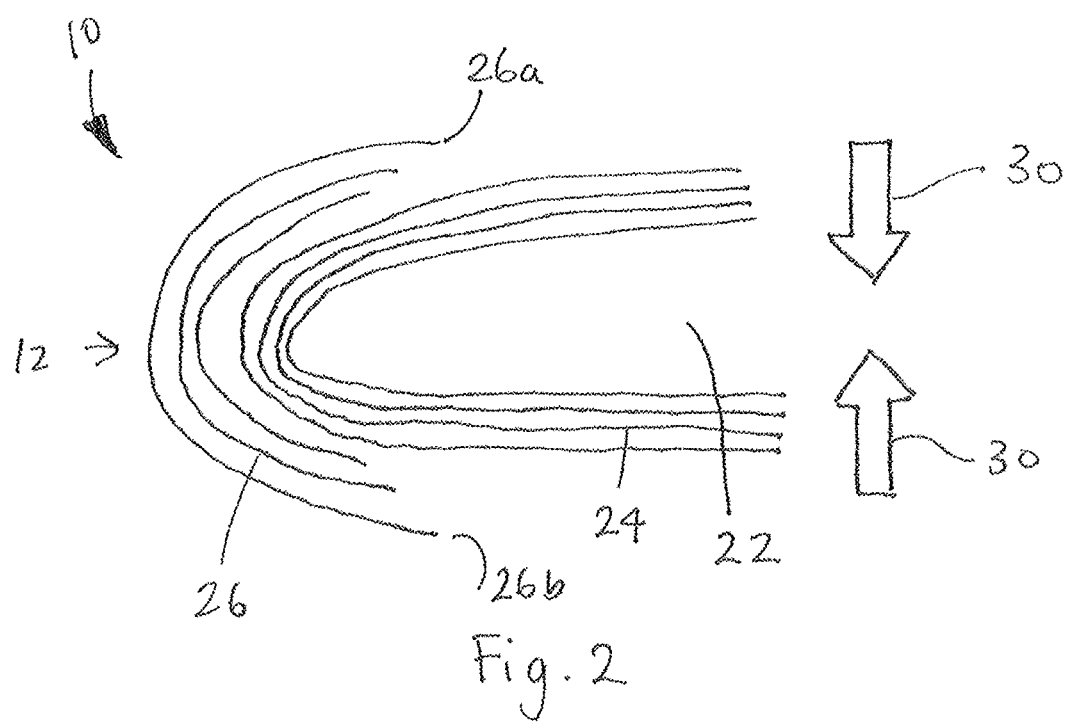
FIG. 2 shows a detail view of the spar of FIG. 1.

FIG. 2 shows a detail view of the leading edge 12 of the spar 10. The skin 24 of the embodiment includes four layers or plies of carbon fibre material pre-impregnated with resin. The compression layers 26 are formed from three further plies of carbon fibre material pre-impregnated with resin. In this embodiment the compression layers 26 each extend over the radius of the leading edge 12 and each has a first end 26a terminating on a suction side 16 of the blade 10 and a second end 26b on the pressure side 18 of the blade 10 such that the majority of the pressure and suction surfaces 18, 16 of the blade 10 are not covered by a compression layer 26. The first ends 26a of each of the compression layers 26 terminate at different points on the suction side 16 of the blade 10. More specifically the first ends 26a of the outer compression layers 26 (those compression layers positioned further from the core) extend beyond the first ends 26a of the inner compression layers 26 (those compression layers positioned closer to the core) such that the outer compression layers cover the first ends 26a of the inner compression layer 26. In much the same way the second ends 26b of the compression layers 26 terminate at different points on the pressure side 18 of the blade 10. The staggered ends 26a, 26b may help provide a smooth outer surface of the blade 10 and provides a smooth transition of stiffness about the circumference of the blade 10. In alternative embodiments the inner compression layers 26 may extend beyond the outer compression layers 26 or the first and second ends 26a, 26b may terminate at the same point along the suction side 16 and pressure side 18.

Although the skin 24 of the described embodiment includes four plies it will be appreciated that any number of plies may be used depending on the structural requirements of the component. Likewise, although the compression layers 26 of the embodiment include three plies, it will be appreciated that any number of plies might be used depending on the required forces needed.

The skin 24 and the plurality of layers 26 together form a shell of the blade 10 having a varied thickness around the circumference of the blade 10 due to the variation in number of plies of material around the circumference of the blade. The thicker portions of the shell have a greater rigidity than the remaining portions of the shell when cured. The thicker portions of the shell may have different thermal properties than the thinner portions. For example the thicker portions may have a different coefficient of thermal expansion than the thinner portions.

Figure 4:
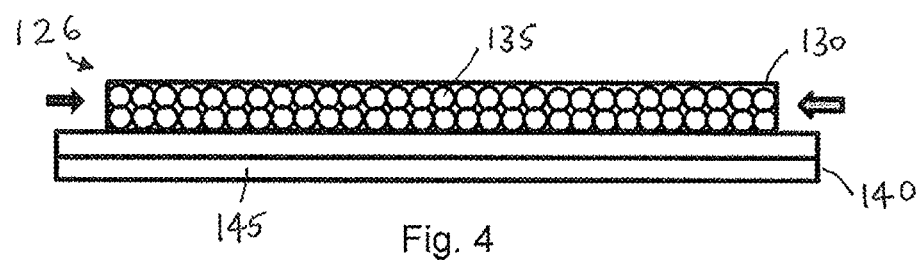
FIG. 4 shows contraction of the compression layer of FIG. 3 after cooling.
Figure 5:
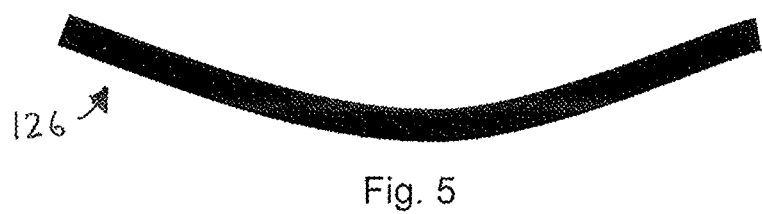
FIG. 5 shows bending of the compression layer of FIG. 4.

After curing of the shell and during cooling of the mould, the variation in the coefficients of thermal expansion causes variation in the contraction of the layers relative to each other. FIG. 4 shows the layer 126 of FIG. 3 after cooling. Due to the orientation of the fibres 135 of the first ply 130, the first ply 130 contracts more that the second ply 140 after cooling. This causes the layer 126 to bend or curve towards the ply 130 with greater contraction as shown in FIG. 5.

When attached to a spar 10 as described above, with the first ply 130 between the second ply 140 and the core, this causes the material of the compression layers 26 to curve inwards towards the core 22 and thereby impart a compressive force on the core 22 in this region in the direction shown by the arrows 30 in FIG. 2. Although the described embodiment includes layers imparting a compressive force on the core, it will be appreciated that the same principal could be applied to impart a tensile force on the core if required, for example by reversing the order of the plies.

Figure 6:
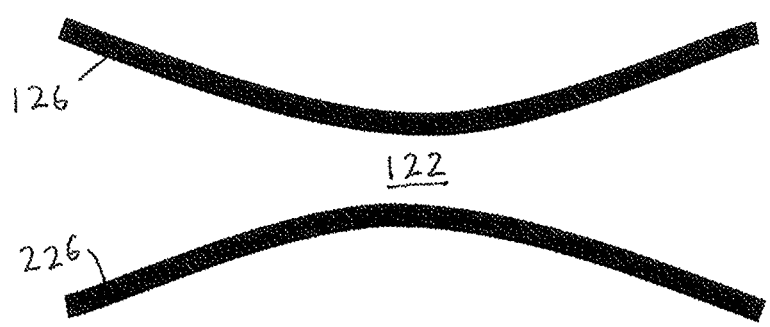
FIG. 6 shows a compression layer arrangement according to an embodiment of the disclosure.

Additionally or alternatively, the compression layers 26 may be applied to the spar 10 on the pressure and suction sides 16, 18 thereof. In these embodiments, a force may be applied to the core 22 by positioning the contracting ply 130 on an outer side of the compression layer 26. Such an arrangement is shown schematically in FIG. 6. In FIG. 6, a first compression layer 126 is positioned on a pressure side surface of the spar 10 and a second compression layer 226 is positioned on a suction side surface of the spar 10. Contraction of the layer 126, 226 after curing causes both layers to bend as shown in FIG. 6 thereby applying a compressive force in a central region on the core 122.

In embodiments, a further layer (not shown) may extend around the core 22 over the compression layers 26 to surround the skin and compression layers. The further layer may be substantially the same as the skin layer 24 such that the compression layers 26 are sandwiched between the skin 24 and further layer.

The composite spar 10 described above is manufactured by the following method.

Firstly, the core 22 is formed from a foam material. The foam core 22 may, for example, be formed by injecting foam material into a mould or by machining foam material to the desired airfoil shape.

Carbon fibre fabric, pre-impregnated with resin is cut into required sizes, namely a first size sufficient to surround the entire circumference of the foam core 22 and a second size sufficient to wrap around selected portions of the foam core 22, in this embodiment at the leading edge 12 and/or trailing edge 14 of the core 22.

Layers or plies of carbon fibre fabric of the first size are then attached to the core 22 such that they surround the entire circumference of the core 22 thereby forming the skin 24. The plies of fabric may be bonded to one another or laminated together prior to attachment to the core 22 or may be attached sequentially to one another on the core 22. The skin 24 may, for example, be attached to the core 22 by adhesive bonding or it may be welded or stitched to the core 22. Alternatively or additionally, the skin 24, or layers thereof may be heated to facilitate attachment to the core 22. The core 22 may also be heated to facilitate attachment. In a particular embodiment, carbon plies 24 are braided around the core 22, and then compression layers 26 formed from dry plies with thermoplastic powder are heated and shaped on leading edge 12 and the trailing edge 14.

Layers or plies of carbon fibre fabric of the second size are then attached to the outer surface of the skin 24 on the leading edge 12 and trailing edge 14 of the blade 10 thereby forming the compression layers 26. The further layers of fabric may be bonded to one another or laminated prior to attachment to the skin 24 or may be attached sequentially to one another on the skin 24. The compression layers 26 may be attached to the skin 24 by adhesive bonding or they may be welded or stitched to the skin 24. Alternatively, the compression layers 26 may be heated to facilitate attachment to the skin 24. The compression layers 26 attached to the leading edge 12 may have a different size to those attached to the trailing edge 14. For example, the leading edge compression layers 26 may extend around a greater portion of the circumference of the spar 10.

The skin 24 and the compression layers 26 may be attached to each other and to the core 22 in a single step. Each of the layers of carbon fibre material may be positioned relative to each other and the core 22 in a mould in the lay-up as described above. The mould may then attach the layers to the core together.

In alternative embodiments, the skin 24 and the compression layers 26 may be provided as dry fabrics. In this case, the method includes a further step of introducing a resin or thermoplastic matrix material to the skin 24 and compression layers 26 before curing. For example, the assembled spar 10 may be placed in a mould and a resin material or thermoplastic matrix may be injected into the mould to impregnate the skin 24 and compression layers 26 within resin or thermoplastic matrix.

While in the embodiment above the layers 26 which only partially extend around the core 22 are positioned outwardly of the skin 24, in an alternative embodiment, they may be attached to the core under the skin layers. The precise order of the layers will be determined for example by the orientation of the fibres in each layer.

The core 22, skin 24 and compression layers 26 are then cured together to form a spar 10.

This described composite structure layup may prevent or reduce the negative effects of residual thermal curing stresses. The asymmetric arrangement of layers across the surface of the spar 10 may induce a compression stress 30 in the core foam 22 after the blade curing cycle. The compression stress 30 may help avoid or reduce tensile or peeling stresses in the spar 10 prior to mechanical loading. For example the stresses 30 may reduce failure in the bonded interface between the skin and the core 22. The increased stiffness of the shell in this region and its tendency to curve towards the core 22 acts to compress or clamp the foam core 22, as shown by the arrows 30 in FIG. 2, as the blade cools after curing.

Although the invention is described above in relation to a spar, the disclosed composite layup can be applied to all kind of composite structures having closed structures, particularly structures including foam or honeycomb cores or hollow balls core or wood core (where mechanical properties of the component are reliant on the integrity of the core material and the bonded interface between shell and the core).

The invention claimed is:

1. A composite component comprising:
   a central region; and
   a shell surrounding the central region, wherein the shell comprises
   a first layer of fabric; and
   a second layer of fabric separate from the first layer of fabric, the first layer of fabric extending around the entire circumference of the central region and the second layer of fabric extending around at least a portion of the circumference of the central region,
   wherein the second layer of fabric includes a ply of material forming at least part of said fabric of the second layer of fabric having a different coefficient of thermal expansion from said fabric of the first layer of fabric such that the second layer of fabric imparts a compressive or tensile force on the central region.

2. The composite component of claim 1, wherein said ply forming at least part of said fabric of the second layer of fabric comprises fibres aligned at an angle relative to fibres in the first layer of fabric forming at least part of said fabric of the first layer of fabric.

3. The composite component of claim 1, wherein said ply forming at least part of said fabric of the second layer of fabric comprises fibres of a different material from fibres in the first layer forming at least part of said fabric of the first layer of fabric.

4. The composite component claim 1 wherein the second layer includes at least two of said plies forming at least part of said fabric of the second layer of fabric, at least one of said plies having a different coefficients of thermal expansion to one another of said plies.

5. The composite component of claim 1, wherein the second layer of fabric extends around only a portion of the circumference of the central region.

6. The composite component of claim 1, wherein the first layer of fabric is positioned between the second layer of fabric and the central region.

7. The composite component of claim 1, wherein the second layer fabric is positioned between the first layer of fabric and the central region.

8. The composite component of claim 1, wherein said ply of material forming at least part of said fabric of the second layer of fabric is one of a plurality of plies of material forming at least part of said fabric of the second layer of fabric, wherein an outer ply of the plurality of plies extends over an inner ply of the plurality of plies such that it covers an edge of the inner ply.

9. The composite component of claim 1, wherein the central region comprises a core.

10. The composite component of claim 1, wherein at least one of:

the first layer of fabric comprises carbon fibres forming at least part of said fabric of said first layer of fabric and a matrix material, and the second layer of fabric comprises carbon fibres forming at least part of said fabric of said layer of fabric and a matrix material; wherein the matrix material is a thermosetting resin.

11. The composite component of claim 1, wherein the composite component is an airfoil structure having:

a leading edge and a trailing edge, the second layer of fabric extending around at least one of the leading edge and trailing edge; and/or a pressure side and a suction side, wherein the second layer of fabric extends along a portion of the pressure side and/or suction side.

12. The composite component of claim 1, further comprising a third layer extending around a different portion of the circumference of the central region than the second layer such that it imparts a compressive force on the central region.

13. The composite component of claim 12, wherein the composite component is an airfoil structure having a leading edge and a trailing edge, wherein the second layer extends around the leading edge and the third layer extends around the trailing edge of the airfoil structure.

14. The composite component of claim 1, further comprising an outer layer surrounding the first and second layers such that the second layer is positioned between the first layer and the outer layer, wherein the outer layer extends around the entire circumference of the central region.

* * * * *